(12) United States Patent
Mitsuhashi

(10) Patent No.: US 8,485,605 B2
(45) Date of Patent: Jul. 16, 2013

(54) CONNECTING DEVICES

(75) Inventor: Atsutaka Mitsuhashi, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 716 days.

(21) Appl. No.: 12/498,530

(22) Filed: Jul. 7, 2009

(65) Prior Publication Data

US 2010/0013288 A1    Jan. 21, 2010

(30) Foreign Application Priority Data

Jul. 15, 2008 (JP) ................................. 2008-183515

(51) Int. Cl.
*B60N 2/225* (2006.01)
*B60N 2/02* (2006.01)
*F16H 1/32* (2006.01)

(52) U.S. Cl.
USPC ......................................... 297/362; 475/180

(58) Field of Classification Search
USPC ......................................... 297/362; 475/180
See application file for complete search history.

(56) References Cited

U.S. PATENT DOCUMENTS

| | | | | |
|---|---|---|---|---|
| 4,302,047 A | * | 11/1981 | Esser | 297/362 |
| 5,188,571 A | * | 2/1993 | Boltze et al. | 475/162 |
| 5,341,699 A | * | 8/1994 | Rouverol | 74/462 |
| 5,695,425 A | * | 12/1997 | Hashimoto et al. | 475/180 |
| 7,384,101 B2 | * | 6/2008 | Kawashima et al. | 297/362 |
| 7,849,758 B2 | * | 12/2010 | Katz | 74/462 |
| 8,061,229 B2 | * | 11/2011 | Zhuravlev | 74/457 |
| 2007/0032332 A1 | | 2/2007 | Ito | |
| 2009/0218844 A1 | | 9/2009 | Mitsuhashi | |
| 2009/0301247 A1 | | 12/2009 | Mitsuhashi et al. | |

FOREIGN PATENT DOCUMENTS

| | | |
|---|---|---|
| JP | 4029847 | 10/2007 |
| WO | WO 2005025930 A2 * | 3/2005 |
| WO | 2008/015845 | 2/2008 |

OTHER PUBLICATIONS

English language Abstract of JP 2005-230116, Sep. 2, 2005.
U.S. Appl. No. 12/498,501 to Mitsuhashi, filed Jul. 7, 2009.
Office Action of related Japanese Application No. 2008-183515, Dec. 11, 2012, along with an English language translation.

* cited by examiner

*Primary Examiner* — David Dunn
*Assistant Examiner* — Tania Abraham
(74) *Attorney, Agent, or Firm* — Greenblum & Bernstein, P.L.C.

(57) ABSTRACT

A gear assembly may include first and second gear wheels meshing with each other and having a meshing line. The meshing line is formed as a combined line that is positioned between first and second curves to determine a meshing range of the meshing line, so as to extend from a point on the first curve positioned radially inside the second curve in a circumferential direction in which the second curve is radially outwardly spaced from the first curve and to reach a point on the second curve. The combined line is composed of a combination of a plurality of line portions.

5 Claims, 11 Drawing Sheets

CONNECTING DEVICES

This application claims priority to Japanese patent application serial number 2008-183515, the contents of which are incorporated herein by reference.

BACKGROUND OF THE INVENTION

1. Field of the Invention

The present invention relates to connecting devices of vehicle seats. More particularly, the present invention relates to connecting devices for rotatably connecting two components (e.g., seat backs and seat cushions) of vehicle seats. Further, the present invention relates to gears, (gear assemblies) used in the connecting devices. More particularly, the present invention relates to gears (gear assemblies) that mesh with each other.

2. Description of Related Art

Generally, a vehicle seat includes a seat back and a seat cushion. The seat back and the seat cushion are rotatably connected via a seat reclining device for adjusting a tilt angle of the seat back. Such a seat reclining device is taught, for example, by Japanese Patent Number 4029847, which corresponds to U.S. Publication Number US 2007/0032332 A1.

The known seat reclining device includes an external gear wheel affixed to a seat cushion (a cushion frame) and an internal gear wheel affixed to a seat back (a back frame). The external gear wheel has teeth that are formed in a (toothed) outer circumferential surface thereof. Similarly, the internal gear wheel has teeth that are formed in a (toothed) inner circumferential surface thereof. The external and internal gear wheels mesh with each other. Further, the number of the teeth of the external gear wheel is set to be different from the number of the teeth of the internal gear wheel.

In the seat reclining device thus constructed, the external gear wheel is relatively moved along the toothed inner circumferential surface of the internal gear wheel while the external gear wheel meshes with the internal gear wheel. At this time, the external gear wheel can move along the toothed inner circumferential surface of the internal gear wheel while meshing points of the external and internal gear wheels are sequentially changed. As a result, the external and internal gear wheels are gradually rotated relative to each other due to a difference between the number of the teeth of the external gear wheel and the number of the teeth of the internal gear wheel, so that the seat back is rotated relative to the seat cushion. Thus, the tilt angle of the seat back can be adjusted.

Further, in the known seat reclining device, the external and internal gear wheels are respectively formed as trochoid curve gear wheels. That is, each of the external and internal gear wheels has a tooth profile that is defined by a trochoid curve. The trochoid curve gear wheels, when mesh with each other, can form an arcuate or curved meshing line (a line connecting a plurality of contacting points). Therefore, the external and internal gear wheels can have an increased meshing ratio. As a result, the trochoid curve gear wheels can produce an increased meshing force.

SUMMARY OF THE INVENTION

For example, in one aspect of the present invention, a gear assembly may include first and second gear wheels meshing with each other and having a meshing line. The meshing line is formed as a combined line that is positioned between first and second curves to determine a meshing range of the meshing line, so as to extend from a point on the first curve positioned radially inside the second curve in a circumferential direction in which the second curve is radially outwardly spaced from the first curve and to reach a point on the second curve. The combined line is composed of a combination of a plurality of line portions.

According to the gear assembly thus constructed, the meshing line can be lengthened in a limited meshing range. That is, a meshing ratio of the first and second gear wheels can be effectively increased. As a result, the gear assembly may have a large meshing force.

In another aspect of the present invention, a connecting device that is capable of rotatably connecting a seat back and a seat cushion may include an internal gear member and an external gear member. The internal gear member is connected to one of the seat back and the seat cushion and has an internal gear wheel. The external gear member is connected to the other of the seat back and the seat cushion and has an external gear wheel. The external gear member is coupled to the internal gears member while the external gear wheel meshes with the internal gear wheel. The external gear wheel has an outer diameter smaller than an inner diameter of the internal gear wheel and has the number of teeth different from the number of teeth of the internal gear wheel. When the external gear wheel relatively moves along an inner circumferential surface of the internal gear wheel while meshing points of the external and internal gear wheels are sequentially changed, the external gear wheel and the internal gear wheel are gradually rotated relative to each other due to a difference between the number of teeth of the internal gear wheel and the number of teeth of the external gear wheel, so that a tilt angle of the seat back can be changed. A meshing line of the internal and external gear wheels is formed as a combined line that is positioned between first and second curves to determine a meshing range of the meshing line, so, as to extend from a point on the first curve positioned radially inside the second curve in a circumferential direction in which the second curve is radially outwardly spaced from the first curve and to reach a point on the second curve. The combined line is composed of a combination of a plurality of line portions.

The connecting device thus constructed can reliably rotatably connect the seat back and the seat cushion, because the internal and external gear wheels may have a large meshing force.

Other objects, features and advantages of the present invention will be readily understood after reading the following detailed description together with the accompanying drawings and the claims.

DETAILED DESCRIPTION OF THE INVENTION

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

A detailed representative embodiment of the present invention will be described with reference FIGS. 1 to 11.

Figure 2:
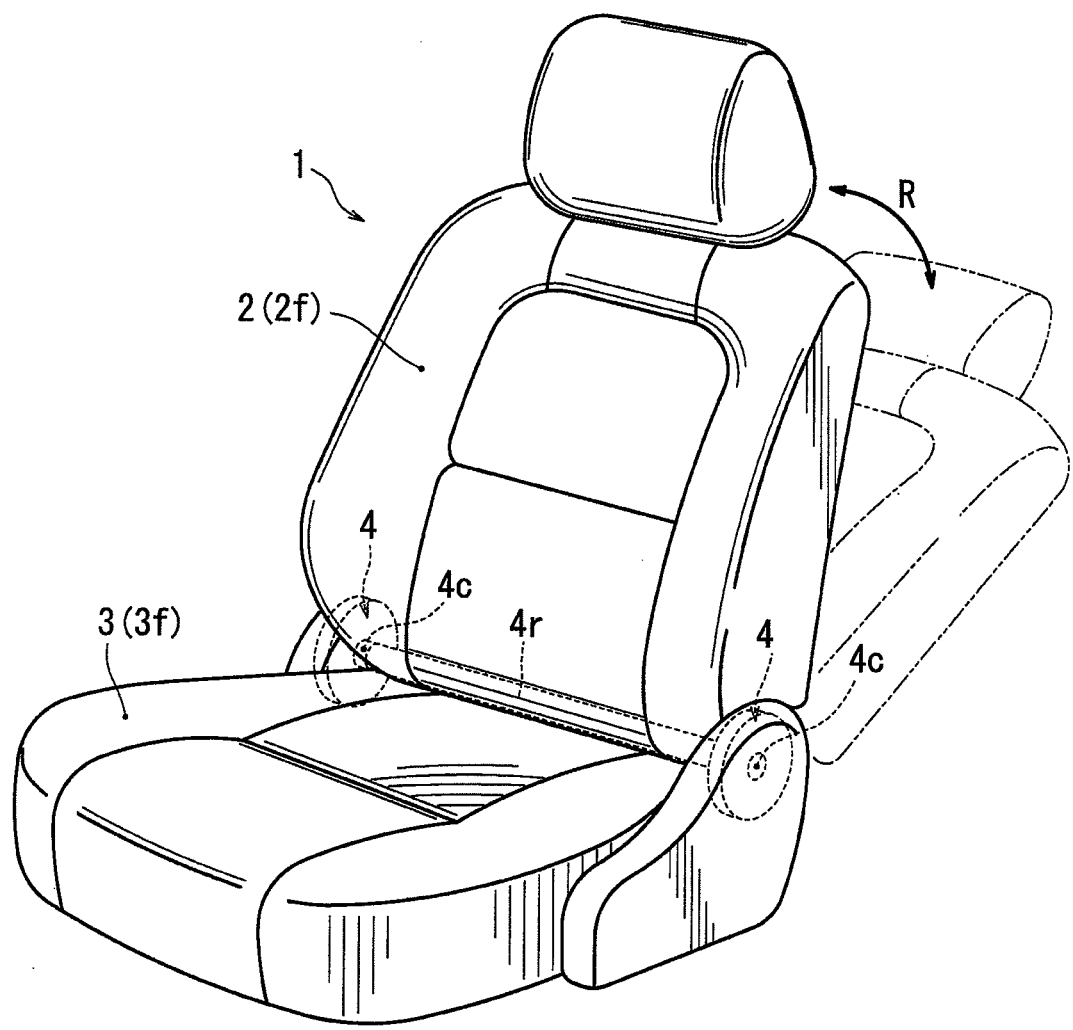
FIG. 2 is a perspective view of a vehicle seat having the reclining device.

As shown in FIG. 2, a representative vehicle seat 1 may preferably be arranged as a driver's seat of a vehicle and include a seat back 2 and a seat cushion 3. The seat back 2 and the seat cushion 3 are respectively connected by a pair of reclining devices 4 (connecting devices) that are disposed on both sides in their width direction.

The reclining devices 4 respectively have operating shafts 4c that are positioned at centers of the reclining devices 4. The operating shafts 4c are respectively connected to an elongated connection member 4r that is disposed therebetween, so that their axial rotating motions can be mutually transmitted therebetween. Thus, the operating shafts 4c can be integrally rotated. Further, an electric motor (not shown) is connected to one of the operating shafts 4c, so as to rotate the operating shafts 4c when the electric motor is rotated (actuated). The electric motor is constructed to be turned on and, off and to be changed in rotational direction by operating a switch (not shown) that is attached to a side portion of the seat cushion 3.

Each of the reclining devices 4 is constructed to be switched between a normal or inoperable condition in which a tilt angle of the seat back 2 can be fixedly maintained and an operable condition in which the tilt angle of the seat back 2 can be adjusted. Switching between the inoperable condition and the operable condition of the reclining device 4 can be performed by simply turning on or off the electric motor. As will be appreciated, because the operating shafts 4c of the reclining devices 4 can be integrally connected to each other via the connection member 4r, the switching between the inoperable condition and the operable condition of the reclining devices 4 can be simultaneously or synchronously performed when the electric motor is operated.

When the electric motor is turned off, the reclining device 4 is in the inoperable condition in which the operating shaft 4c is not rotated (immobilized). In the inoperable condition of the reclining device 4, the seat back 2 is maintained in an unrotatable condition in which the tilt angle thereof is fixed to a desired angle. To the contrary, when the electric motor is turned on, the reclining device 4 is switched to the operable condition in which the operating shafts 4c can be rotated. In the operable condition of the reclining device 4, the seat back 2 can be tilted forwardly and backwardly over a rotational range (shown by a two-headed arrow R in FIG. 2) by rotating the electric motor in a normal direction or a reverse direction (i.e., by rotating the operating shaft 4c forwardly or backwardly), so that the tilt angle of the seat back 2 can be adjusted. Naturally, when the electric motor is turned off after adjustment, the reclining device 4 is switched to the inoperable condition, so that the tilt angle of the seat back 2 can be fixed to an adjusted angle.

Next, structure of each of the reclining devices 4 will now be described.

As will be appreciated, the reclining devices 4 respectively have the substantially same construction as each other with the exception of one aspect that they are formed so as to be exactly opposite (symmetrical) to each other. Therefore, the reclining device 4 that is disposed on the left side of the vehicle seat 1 (which correspond to the right side in FIG. 2) will be described hereinafter.

Figure 1:
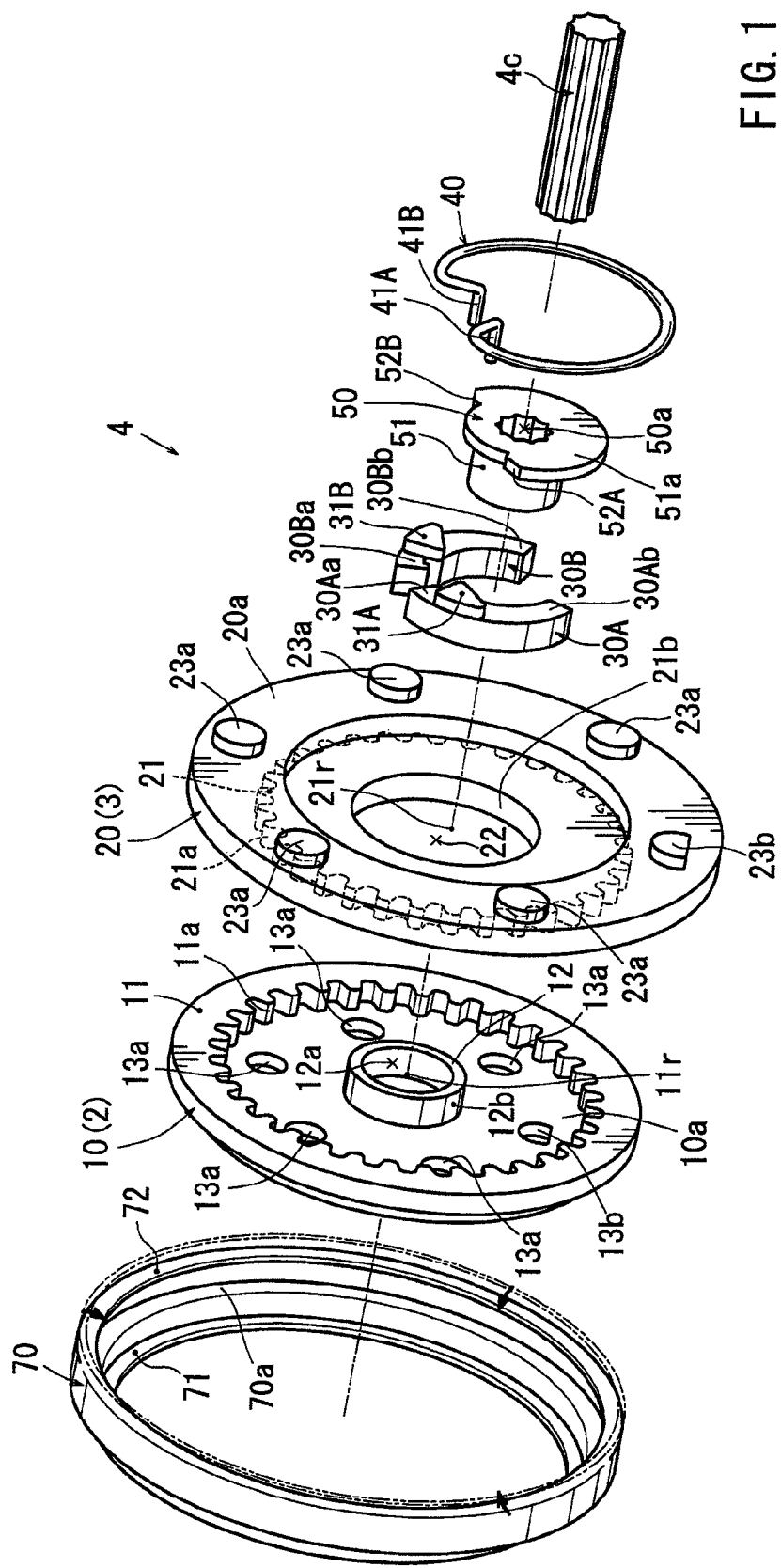
FIG. 1 is an exploded perspective view of a reclining device according to a representative embodiment of the present invention.

As shown in FIG. 1, the reclining device 4 includes a disk-shaped internal gear member 10 (a rotational member or a first connecting element), a disk-shaped external gear member 20 (a stationary member or a second connecting element), a pair of pusher members (pusher pieces) or eccentric members (eccentric pieces) 30A and 30B, an open ring-shaped spring member 40, an operating member 50 that is attached to (journaled on) the operating shaft 4c, and a clip ring 70 (a retainer member), which are preferably made of steel.

The internal gear member 10 is constructed to be affixed to a back frame 2f (a first or movable component) of the seat back 2. Further, the internal gear member 10 may preferably be formed by half die cutting a circular steel sheet material or steel sheet blank (not shown). Conversely, the external gear member 20 is constructed to be affixed to a cushion frame 3f (a second or immovable component) of the seat cushion 3. Similar to the internal gear member 10, the external gear member 20 may preferably be formed by half die cutting a circular steel sheet material or steel sheet blank (not shown).

As shown in FIG. 1, the internal gear member 10 has a disk-shaped base portion 10a, an annular (cylindrical) wall portion 11 and a cylindrical portion 12. The annular wall portion 11 is integrally formed in the base portion 10a so as to be projected from a circumferential periphery of the base portion 10a in an axial direction (in a thickness direction). The annular wall portion 11 of the internal gear member 10 includes inwardly-faced teeth 11a that are formed in an inner circumferential surface thereof. Therefore, the annular wall portion 11 will be hereinafter referred to as a first or internal gear wheel 11. The cylindrical portion 12 is integrally formed in the base portion 10a so as to be axially projected from a central portion of the base portion 10a. The cylindrical portion 12 is projected in the same direction as the internal gear wheel 11.

The cylindrical portion 12 has a shaft insertion bore 12a having a circular shape in cross section. As will be appreciated, the shaft insertion bore 12a is shaped such that the operating shaft 4c can be inserted therethrough. The shaft insertion bore 12a may preferably be formed so as to be positioned coaxially with the internal gear wheel 11. That is, the shaft insertion bore 12a may preferably have an axis that is aligned with a center 11r of the internal gearwheel 11.

Further, the internal gear, member 10 has a plurality of (five in this embodiment) circular engagement projections or dowels 13a and a D-shaped engagement projection or dowel 13b. The circular dowels 13a and the D-shaped dowel 13b are respectively formed in the base portion 10a so as to be projected in a direction opposite to the internal gear wheel 11. The dowels 13a and 13b may preferably be positioned along the internal gear wheel 11 at equal intervals.

Figure 3:
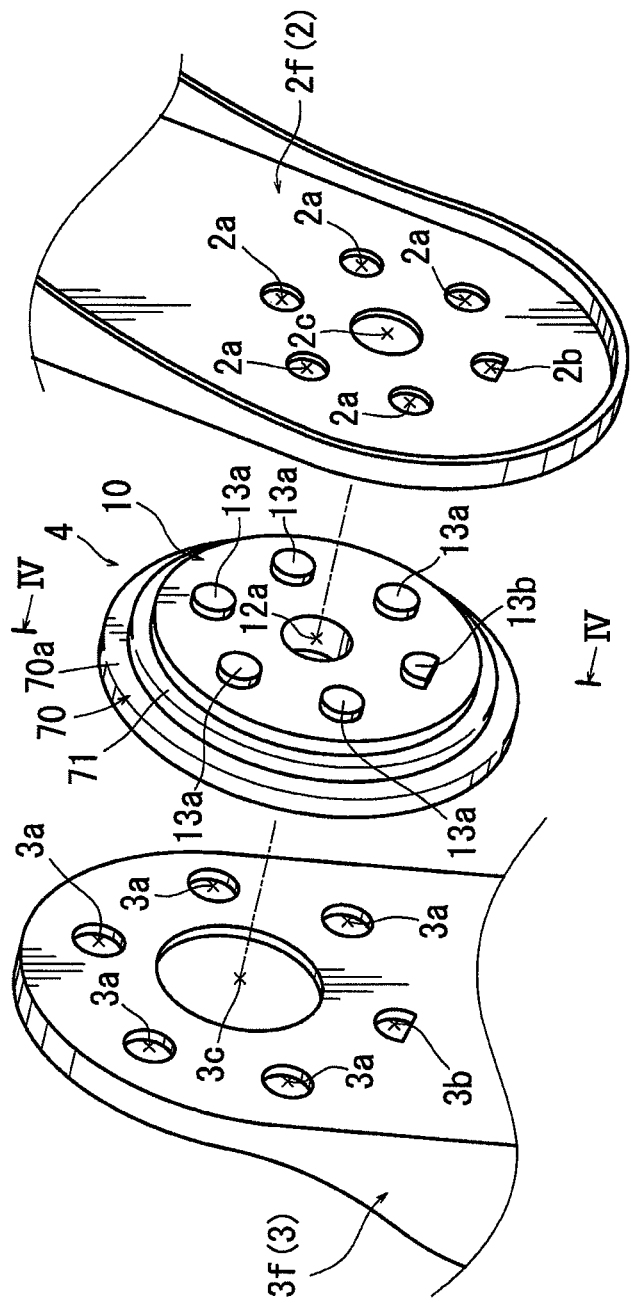
FIG. 3 is a perspective view of the reclining device that is arranged to be attached to a back frame and a cushion frame.

Further, as shown in FIG. 3, the shaft insertion bore 12a and the dowels 13a and 13b may preferably be positioned so as to correspond to a through hole 2c, a plurality of (five in this embodiment) circular dowel insertion holes 2a and a D-shaped dowel insertion hole 2b that are respectively formed in the back frame 2f. Therefore, the internal gear member 10 can be attached to the back frame 2f by fitting the dowels 13a and 13b into the dowel insertion holes 2a and 2b. At this time, the shaft insertion bore 12a can be aligned with the through hole 2c. Further, the internal gear member 10 may preferably be affixed to the back frame 2f by welding.

As shown in FIG. 1, the external gear member 20 has a disk-shaped base portion 20a and a cylindrical portion 21. The disk-shaped base portion 20a has a diameter greater than the diameter of the internal gear member 10. The cylindrical portion 21 is integrally formed in the base portion 20a so as to be axially projected from a central portion of the base portion 20a in an axial direction (in a thickness direction). Further, the cylindrical portion 21 is projected in a direction opposite to the cylindrical portion 12 of the internal gear member 10. The cylindrical portion wheel 21 of the external gear member 20 includes outwardly-faced teeth 21a that are formed in an outer circumferential surface thereof. Therefore, the cylindrical portion 21 will be hereinafter referred to as a second or external gear wheel 21.

The external gear wheel 21 has a (outer) diameter smaller than an inner diameter of the internal gear wheel 11 of the internal gear member 10. Further, the teeth 21a formed in the external gear wheel 21 are capable of meshing with the teeth 11a formed in the internal gear wheel 11 of the internal gear member 10. However, the number of the teeth 21a is set to be fewer than the number of the teeth 11a. In this embodiment, the number of the teeth 21a is thirty three (33) whereas the number of the teeth 11a is thirty four (34).

Further, the external gear wheel 21 has an enlarged opening 22 having a circular shape in cross section. The opening 22 has a diameter greater than an outer diameter of the cylindrical portion 12 of the internal gear member 10. The opening 22 may preferably be formed so as to be positioned coaxially with the external gear wheel 21. That is, the opening 22 may preferably has an axis that is aligned with a center 21r of the external gear wheel 21.

Figure 4:
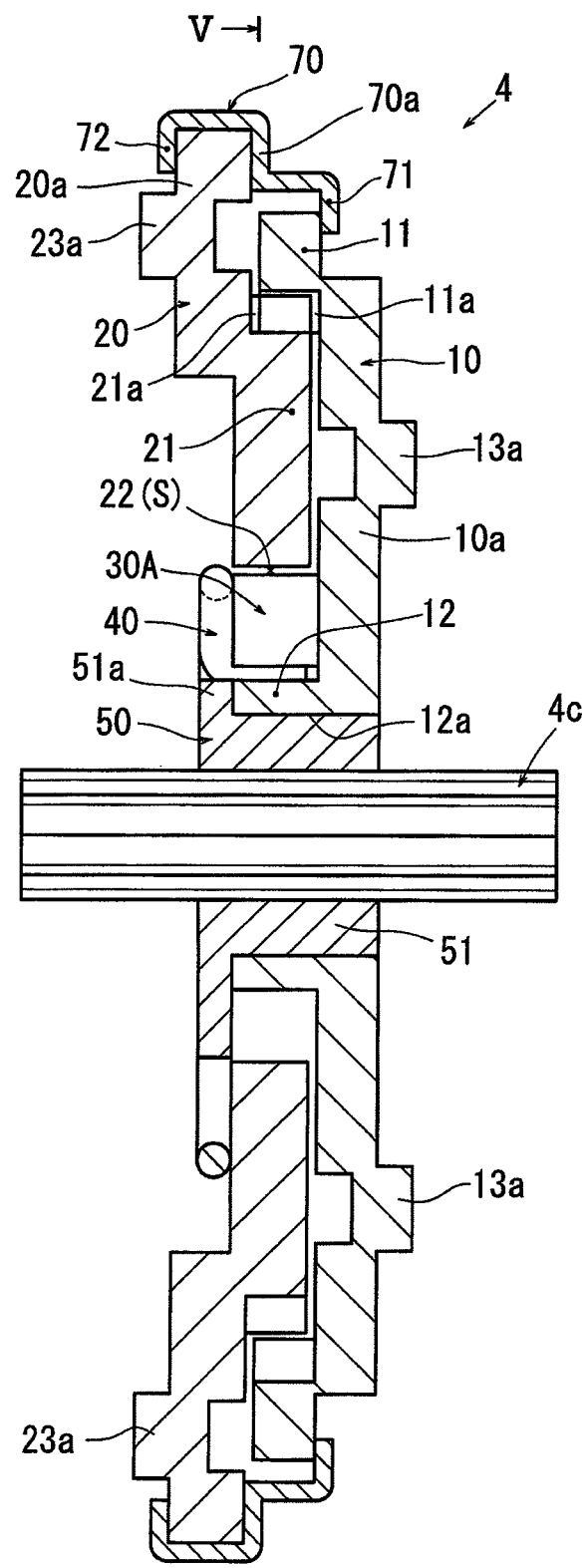
FIG. 4 is a cross-sectional view taken along line IV-IV in FIG. 3.
Figure 5:
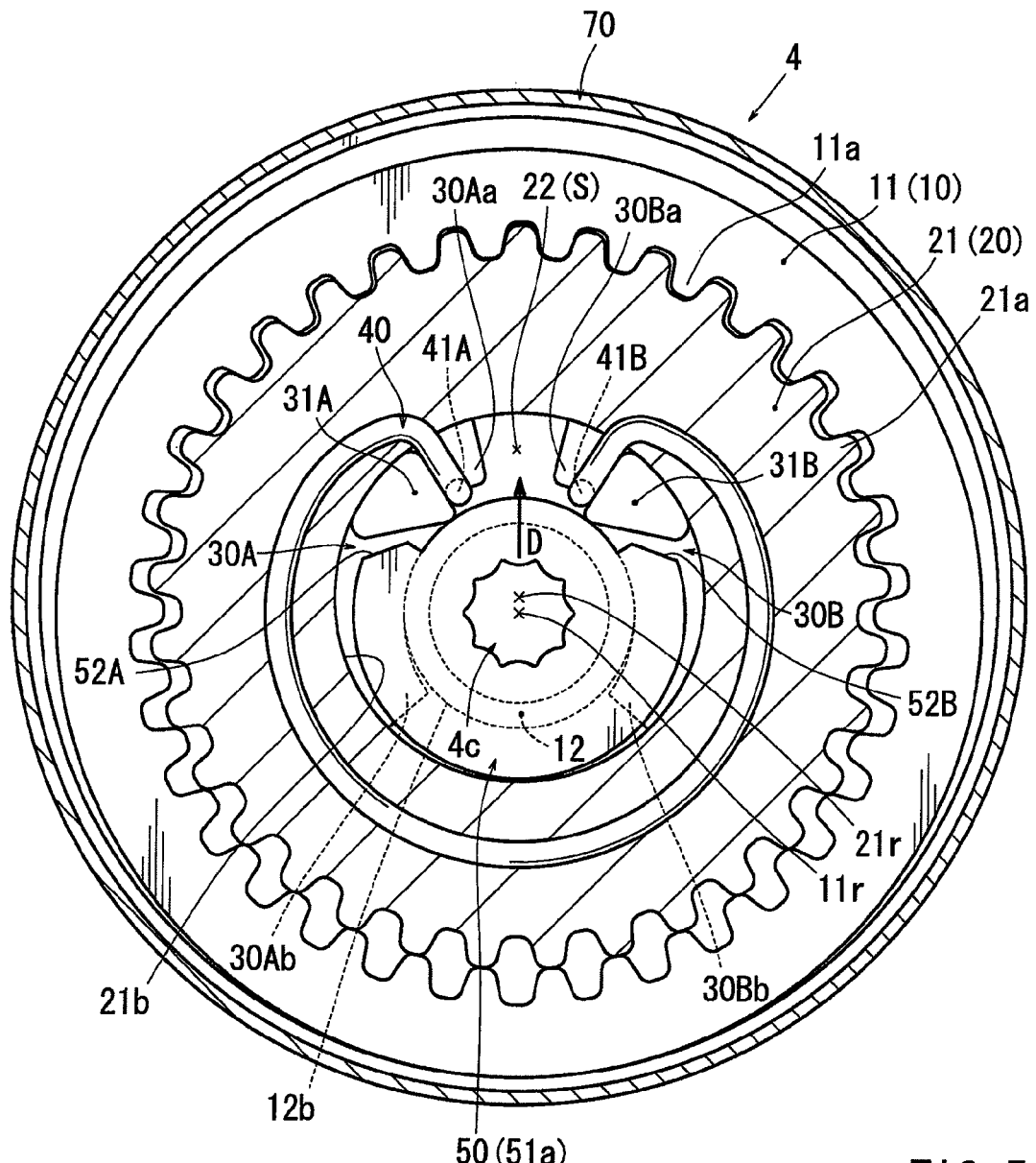
FIG. 5 is a cross-sectional view taken along line V-V in FIG. 4, which illustrates a condition in which the reclining device is in an inoperable condition.
Figure 6:
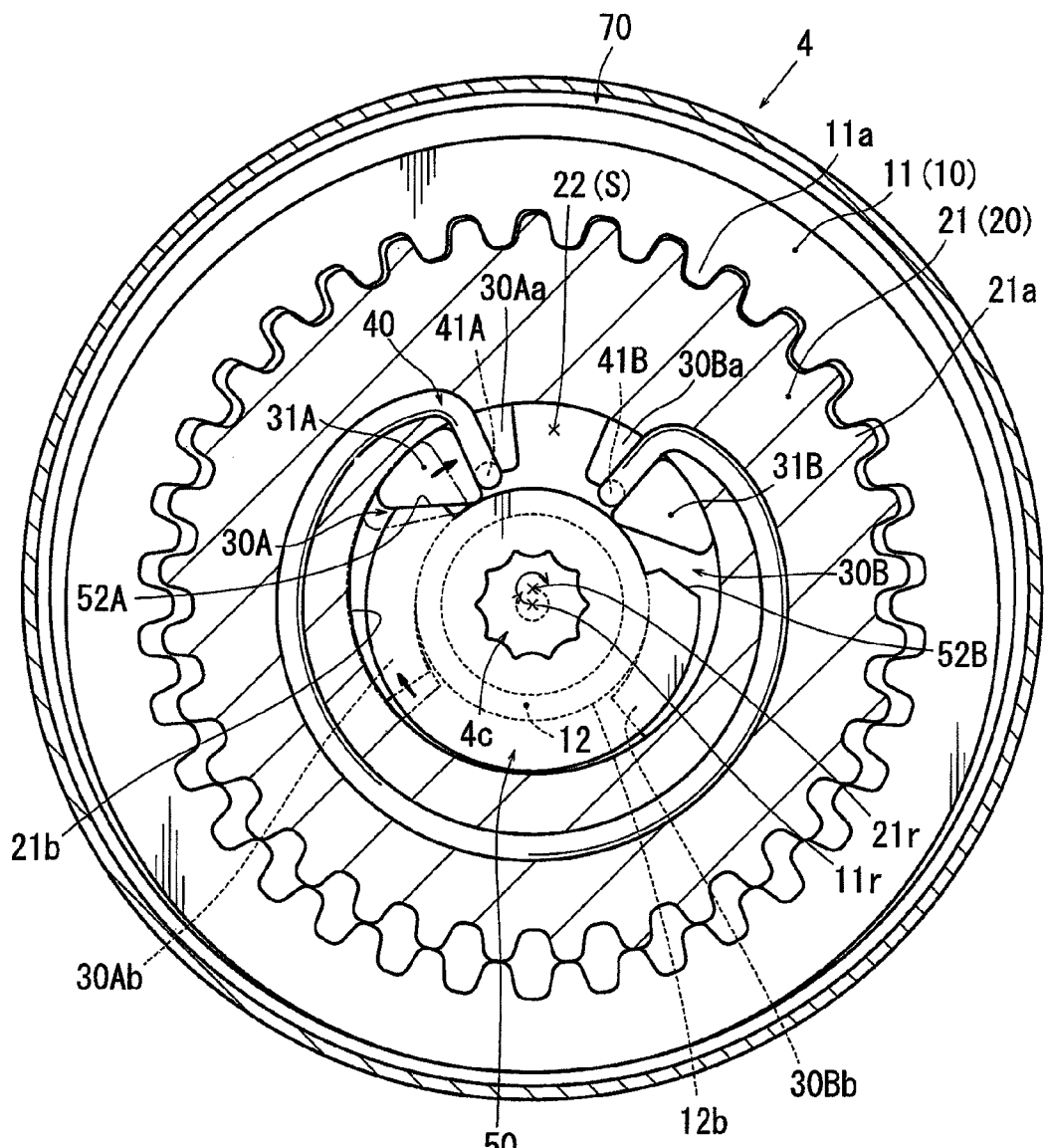
FIG. 6 is a cross-sectional view taken along line VI-VI in FIG. 4, which illustrates a condition in which the reclining device is in an operable condition.

As shown in FIGS. 4 to 6, the external gear member 20 thus constructed can be coupled to the internal gear member 10 while the cylindrical portion 12 of the internal gear member 10 is positioned within the opening 22 of the external gear wheel 21. Further, as shown in FIGS. 5 and 6, the external gear member 20 can be coupled to the internal gear member 10 while the center 21r of the external gear wheel 21 is offset or deviated from the center 11r of the internal gear wheel 11. In other words, the external gear member 20 can be coupled to the internal gear member 10 while the teeth 21a formed in the external gear wheel 21 partially mesh with the teeth 11a formed in the internal gear wheel 11 of the internal gear member 10. As a result, when the external gear member 20 is coupled to the internal gear member 10, a circumferentially nonuniform annular space or eccentric annular space S is formed within the opening 22. In particular, the eccentric annular space S can be defined by an inner circumferential surface 21b of the external gear wheel 21 and an outer circumferential surface 12b of the cylindrical portion 12.

Further, the external gear member 20 has a plurality of (five in this embodiment) circular engagement projections or dowels 23a and a D-shaped engagement projection or dowel 23b. The circular dowels 23a and the D-shaped dowel 23b are respectively formed in the base portion 20a so as to be projected in a direction opposite to the external gear wheel 21. The dowels 23a and 23b may preferably be positioned along a circumferential periphery of the base portion 20a at equal intervals Further, as shown in FIG. 3, the opening 22 and the dowels 23a and 23b (FIG. 1) may preferably be positioned so as to correspond to an enlarged through hole 3c, a plurality of (five in this embodiment) circular dowel insertion holes 3a and a D-shaped dowel insertion hole 3b that are respectively formed in the cushion frame 3f. Therefore, the external gear member 20 can be attached to the cushion frame 3f by fitting the dowels 23a and 23b into the dowel insertion holes 3a and 3b. At this time, the opening 22 can be aligned with the through hole 3c. Further, the external gear member 20 may preferably be affixed to the cushion frame 3f by welding.

As shown in FIGS. 1, 5 and 6, the eccentric members 30A and 30B are symmetrically shaped. Each of the eccentric members 30A and 30B is shaped so as to be closely fitted into the eccentric annular space S formed in the opening 22. In particular, the eccentric members 30A and 30B are respectively arcuately shaped and include thickened end portions 30Aa and 30Ba and thinned end portions 30Ab and 30Bb. Therefore, when the eccentric members 30A and 30B are respectively fitted into the annular space S, the thickened end portions 30Aa and 30Ba (and the thinned end portions 30Ab and 30Bb) thereof can be positioned opposite to each other. Further, as best shown in FIG. 1, projections 31A and 31B are respectively formed in the thickened end portions 30Aa and 30Ba of the eccentric members 30A and 30B. The projections 31A and 31B may preferably be axially projected therefrom.

As shown in FIGS. 5 and 6, the spring member 40 has engagement end portions 41A and 41B. The spring member 40 can be attached to the eccentric members 30A and 30B while the engagement end portions 41A and 41B respectively engage the thickened end portions 30Aa and 30Ba of the eccentric members 30A and 30B. Further, the spring member 40 is constructed to normally circumferentially press or bias the eccentric members 30A and 30B in such a direction in which the thickened end portions 30Aa and 30Ba are, circumferentially spaced from each other when the spring member 40 is attached thereto.

Therefore, in a condition in which the spring member 40 is attached to the eccentric members 30A and 30B, due to a spring force of the spring member 40, the external gear member 20 (the external gear wheel 21) can normally be outwardly biased with respect to the cylindrical portion 12 of the internal gear member 10 in such a direction in which the center 21r of the external gear wheel 21 is deviated with respect to the center 11r of the internal gear wheel 11 (i.e., a direction shown by an arrow D in FIG. 5). As a result, the external gear wheel 21 can be pressed to the internal gear wheel 11 of the internal gear member 10, so that the teeth 21a formed in the external gear wheel 21 can reliably mesh with the teeth 11a formed in the internal gear wheel 11 without producing backrush therebetween. Therefore, the external gear member 20 can be maintained in a condition (an immovable condition) in which the external gear member 20 can be prevented from moving relative to the internal gear member 10.

As shown in FIG. 1, the operating member 50 is attached and secured to the operating shaft 4c so as to be integrally rotated therewith. In particular, the operating member 50 is attached to (journaled on) the operating shaft 4c while a serrated portion formed in an insertion bore 50a thereof engages a corresponding serrated portion formed in an outer surface of the operating shaft 4c.

The operating member 50 includes a cylindrical portion 51 and an annular collar portion 51a radially projected from the cylindrical portion 51. As shown in FIGS. 1, 5 and 6, the collar portion 51a is partially removed, so as to have shouldered portions. The shouldered portions will be referred to as pressing portions 52A and 52B. As shown in FIG. 5, the operating member 50 is arranged and constructed such that the pressing portions 52A and 52B are positioned adjacent to the projections 31A and 31B formed in the eccentric members 30A and 30B when the reclining device 4 is assembled (i.e., when the cylindrical portion 51 of the operating member 50 (the operating shaft 4c) is inserted into the shaft insertion bore 12a of the cylindrical portion 12 after the external gear member 20 is coupled to the internal gear member 10). Therefore, as shown in FIG. 6, for example, when the operating member 50 (the operating shaft 4c) is rotated clockwise, the projection 31A of the eccentric member 30A can be pressed clockwise by the pressing portion 52A, so that the eccentric member 30A can be rotated clockwise against the spring force of the spring member 40. At the same time, the eccentric member 30B can be rotated in the same direction (clockwise) by the spring force of the spring member 40. Thus, the immovable condition of the external gear member 20 can be released.

Upon clockwise rotation of the eccentric members 30A and 30B, the inner circumferential surface 21b of the external gear wheel 21 can be sequentially pressed outwardly by the thickened end portions 30Aa and 30Ba of the eccentric members 30A and 30B. As a result, the external gear wheel 21 can relatively move clockwise along the inner circumferential surface of the internal gear wheel 11 while the teeth 21a formed in the external gear wheel 21 mesh with the teeth 11a formed in the internal gear wheel 11. At this time, the external gear wheel 21 can move along the inner circumferential surface of the internal gear wheel 11 while meshing points of the external and internal gear wheels 11 and 21 are sequentially changed. That is, the external gear wheel 21 can relatively move clockwise while the center 21r of the external gear wheel 21 rotates around the center 11r of the internal gear wheel 11.

When the rotation of the operating member 50 (the operating shaft 4c) is stopped, the rotation of the eccentric members 30A and 30B is also stopped. As a result, the eccentric members 30A and 30B can be circumferentially pressed by the spring member 40 in the direction in which the thickened end portions 30Aa and 30Ba are circumferentially spaced from each other. Thus, the external gear wheel 21 can be prevented from relatively moving clockwise along the inner circumferential surface of the internal gear wheel 11.

Next, the clip ring 70 is arranged and constructed to relatively rotatably fasten or clamp the internal and external gear members 10 and 20 that are axially oppositely mated or coupled to each other. As shown in FIG. 1, the clip ring 70 is an annular steel ring. The clip ring 70 has a first annular support wall 71 (a first retainer portion), a second enlarged annular support wall 72 (a second retainer portion) and a shouldered portion 70a. Further, the second annular support wall 72 can be formed by radially crimping a circumferential periphery of the clip ring 70 after the clip ring 70 is attached to the coupled internal and external gear members 10 and 20.

Next, a manufacturing process of the reclining device 4 will be described.

As shown in FIG. 4, after internal and external gear members 10 and 20 are axially coupled to each other, the cylindrical portion 51 of the operating member 50 attached to the operating shaft 4c is inserted into the shaft insertion bore 12a of the cylindrical portion 12 while the eccentric members 30A a 30B are fitted into the annular space S formed in the opening 22. Thereafter, the spring member 40 is attached to the eccentric members 30A and 30B. The internal and external gear members 10 and 20 thus coupled are circumferentially clamped or fastened via the clip ring 70, so as to be prevented from being axially separated from each other. In particular, the clip ring 70 is positioned such that first annular support wall 71 and the shouldered portion 70a can respectively contact an outer surface of the internal gear wheel 11 of the internal gear member 10 and an inner surface of the base portion 20a of the external gear member 20. Thereafter, the circumferential periphery of the clip ring 70 is radially crimped so as to be folded over an outer surface, of the base portion 20a of the external gear member 20, thereby forming the second annular support wall 72. As a result, the clip ring 70 is fixed to the external gear member 20 while the internal gear member 10 is axially partially supported by the first support wall 71 of the clip ring 70, so that the internal and external gear members 10 and 20 can be fastened. Thus, the reclining device 4 can be assembled.

Further, the clip ring 70 is constructed to produce small clearances between the internal gear wheel 11 of the internal gear member 10 and the first support wall 71 of the clip ring 70 when the clip ring 70 is fixed to the external gear member 20. Therefore, the internal and external gear members 10 and 20 can be smoothly rotated relative to each other.

As shown in FIG. 3, the reclining device 4 thus assembled is connected to the back frame 2f and the cushion frame 3f while the operating shaft 4c is passed through the through hole 2c formed in the back frame 2f and the enlarged through hole 3c formed in the cushion frame 3f. In particular, the internal gear member 10 is attached to the back frame 2f by fitting the dowels 13a and 13b into the dowel insertion holes 2a and 2b. At the same time, the external gear member 20 is attached to the cushion frame 3f by fitting the dowels 23a and 23b into the dowel insertion holes 3a, and 3b. Similarly, the reclining device 4 that is disposed on the left side of the vehicle seat 1 is connected to the back frame 2f and the cushion frame 3f. Thus, the back frame 2f and the cushion frame 3f (the seat back 2 and the seat cushion 3) are respectively connected by the two reclining devices 4.

Operation of the reclining device 4 will now be described with reference to FIGS. 5 and 6.

As shown in FIG. 5, due to the spring force of the spring member 40, the eccentric members 30A and 30B is normally circumferentially pressed or biased in the direction in which the thickened end portions 30Aa and 30Ba thereof are circumferentially spaced from each other. Therefore, the external gear member 20 (the external gear wheel 21) is outwardly biased with respect to the cylindrical portion 12 of the internal gear member 10 in the direction in which the center 21r of the external gear wheel 21 is deviated with respect to the center 11r of the internal gear wheel 11 (i.e., the direction shown by the arrow D in FIG. 5). As a result, the external gear wheel 21 can be pressed to the internal gear wheel 11 of the internal gear member 10, so that the teeth 21a formed in the external gear wheel 21 can reliably mesh with the teeth 11a formed in the internal gear wheel 11. Therefore, the external gear member 20 and the internal gear member 10 can be maintained in a condition in which they are prevented from moving relative to each other. Thus, the reclining device 4 can be maintained in a locking condition.

As shown in FIG. 6, for example, when the operating member 50 (the operating shaft 4c) is rotated clockwise, the projection 31A of the eccentric member 30A can be pressed clockwise by the pressing portion 52A, so that the eccentric member 30A is rotated clockwise against the spring force of the spring member 40. At the same time, the eccentric member 30B is rotated clockwise by the spring force of the spring member 40. Thus, the reclining device 4 can be changed to an unlocking condition.

Upon clockwise rotation of the eccentric members 30A and 30B, the inner circumferential surface 21b of the external gear wheel 21 is sequentially pressed outwardly by the thickened end portions 30Aa and 30Ba of the eccentric members 30A and 30B. As a result, the external gear wheel 21 relatively moves clockwise along the inner circumferential surface of the internal gear wheel 11 while the teeth 21a formed in the external gear wheel 21 partially mesh with the teeth 11a formed in the internal gear wheel 11. That is, the external gear wheel 21 relatively moves clockwise while the center 21r of the external gear wheel 21 rotates around the center 11r of the internal gear wheel 11. At this time, the external gear wheel 21 (the external gear member 20) is gradually rotated counterclockwise about the center 21r thereof due to a difference between the number (33) of the teeth 21a and the number (34) of the teeth 11a.

However, in this embodiment, the external gear member 20 is connected to the cushion frame 3f (the immovable component). That is, the external gear wheel 21 (the external gear member 20) cannot be moved and rotated. Conversely, the internal gear member 10 is connected to the back frame 2f (the movable component). Therefore, instead of the external gear wheel 21 (the external gear member 20), the internal gear wheel 11 of the internal gear member 10 moves clockwise along the outer circumferential surface of the external gear wheel 21 while the teeth 11a formed in the internal gear wheel 11 partially mesh with the teeth 21a formed in the external gear wheel 21. That is, the internal gear wheel 11 moves clockwise while the center 11r thereof rotates around the center 21r of the external gear wheel 21. At this time, the internal gear wheel 11 (the internal gear member 10) is gradually rotated counterclockwise about the center 11r thereof due to the difference between the number (33) of the teeth 21a and the number (34) of the teeth 11a. Thus, the internal gear member 10 can gradually rotate about the center 11r while moving around the external gear member 20. Upon rotation of the internal gear wheel 11 (the internal gear member 10), the back frame 2f can rotate in the same manner as the internal gear member 10 because the back frame 2f is fixedly connected to the internal gear member 10. Thus, the tilt angle of the seat back 2 can be changed and adjusted.

When the rotation of the operating member 50 (the operating shaft 4c) is stopped, the rotation of the eccentric members 30A and 30B is also stopped. As a result, the eccentric members 30A and 30B can be circumferentially pressed by the spring member 40 in the direction in which the thickened end portions 30Aa and 30Ba are circumferentially spaced from each other. Therefore, the internal gear wheel 11 can be prevented from moving clockwise. Thus, the reclining device 4 can be maintained in the locking condition again, so that the tilt angle of the set back 2 can be fixed to an adjusted tilt angle.

Figure 8:
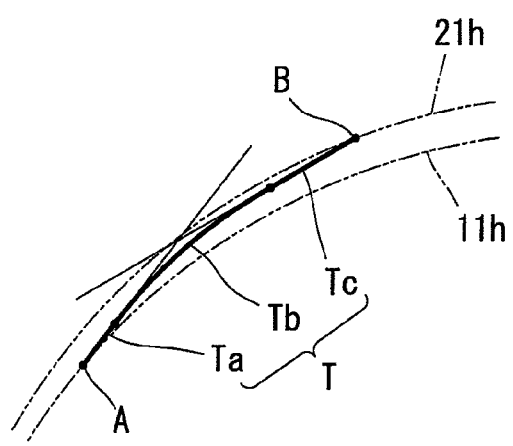
FIG. 8 is an explanatory view of the meshing line of the internal and external gear wheels.

Further, in the present embodiment, the internal gear wheel 11 of the internal gear member 10 and the external gear wheel 21 of the external gear member 20 respectively have special tooth profiles (tooth shapes). As shown in FIG. 8, the tooth profiles of the internal gear wheel 11 and the external gear wheel 21 are respectively determined such that a meshing line T of the internal and external gear wheels 11 and 21 (i.e., a line describing a trajectory of contacting points of the meshing teeth 11a and 21a of the internal and external gear wheels 11 and 21) can be defined as a combined line composed of a combination of two straight line portions Ta and Tc and a curved line portion Tb smoothly connecting the straight line portions Ta an Tc.

Figure 7:
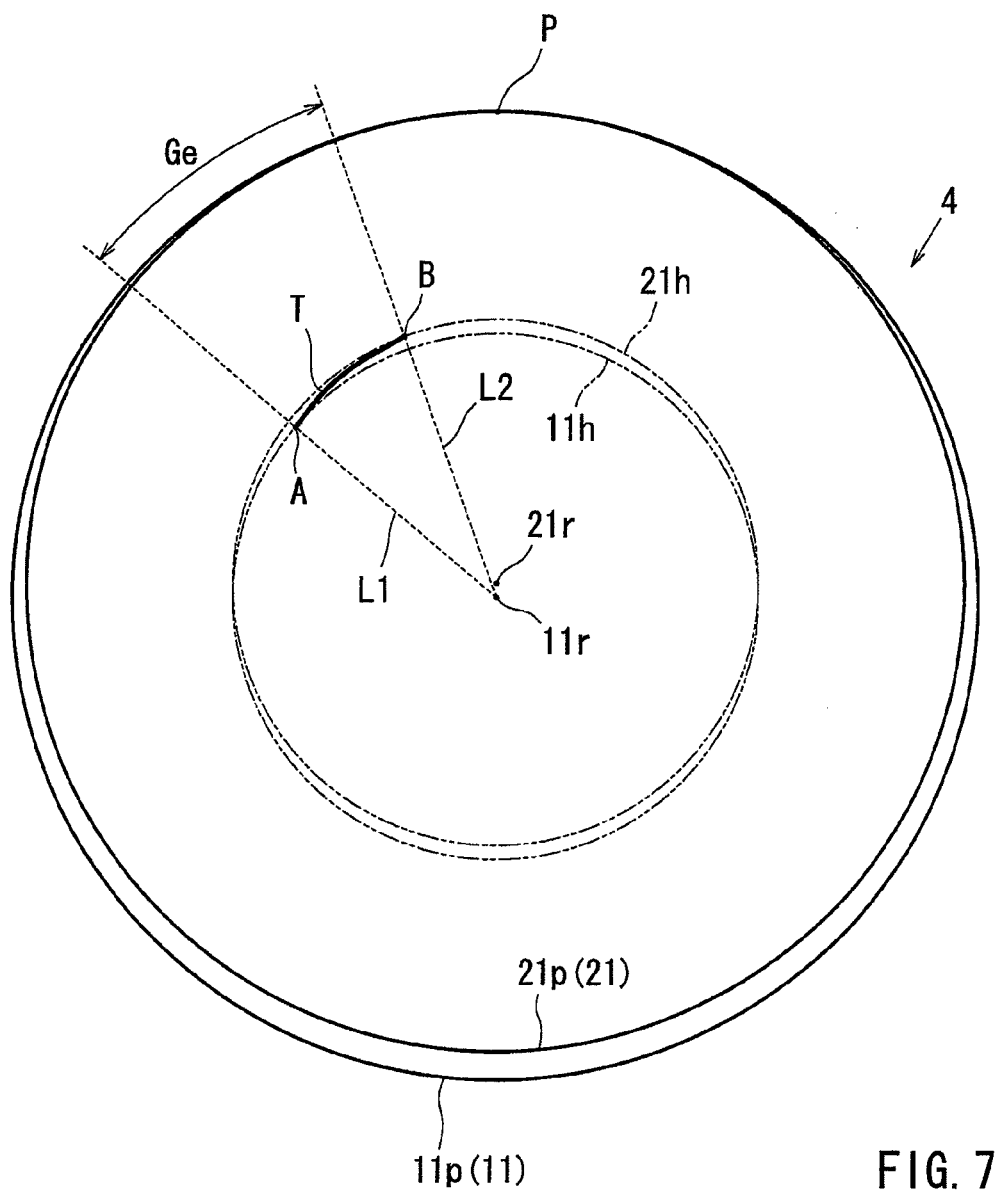
FIG. 7 is an explanatory view which illustrates a relation between a meshing line of internal and external gear wheels and two curves defining a meshing range.
Figure 10:
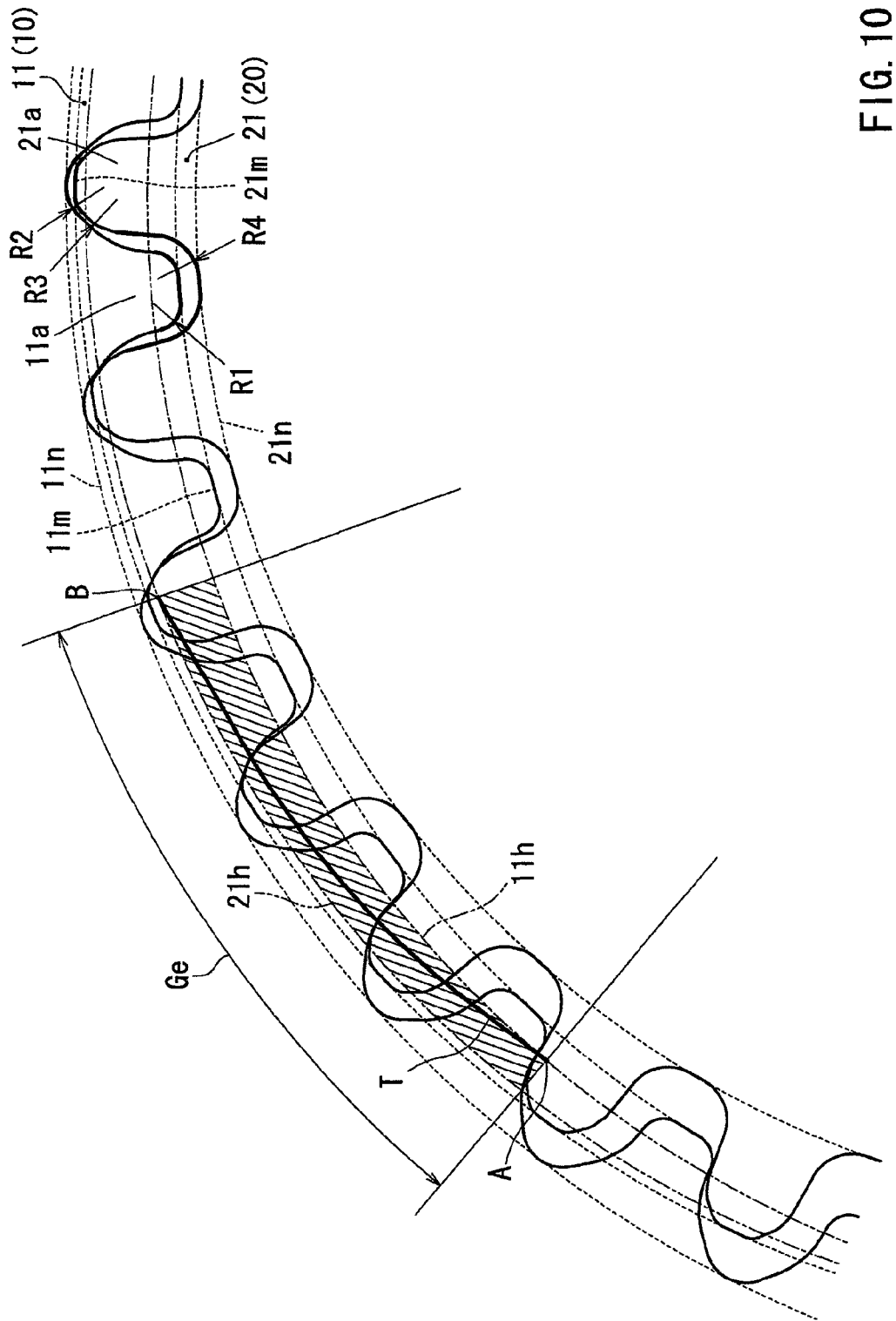
FIG. 10 is a partially enlarged elevational view of the internal and external gear wheels.
Figure 11:
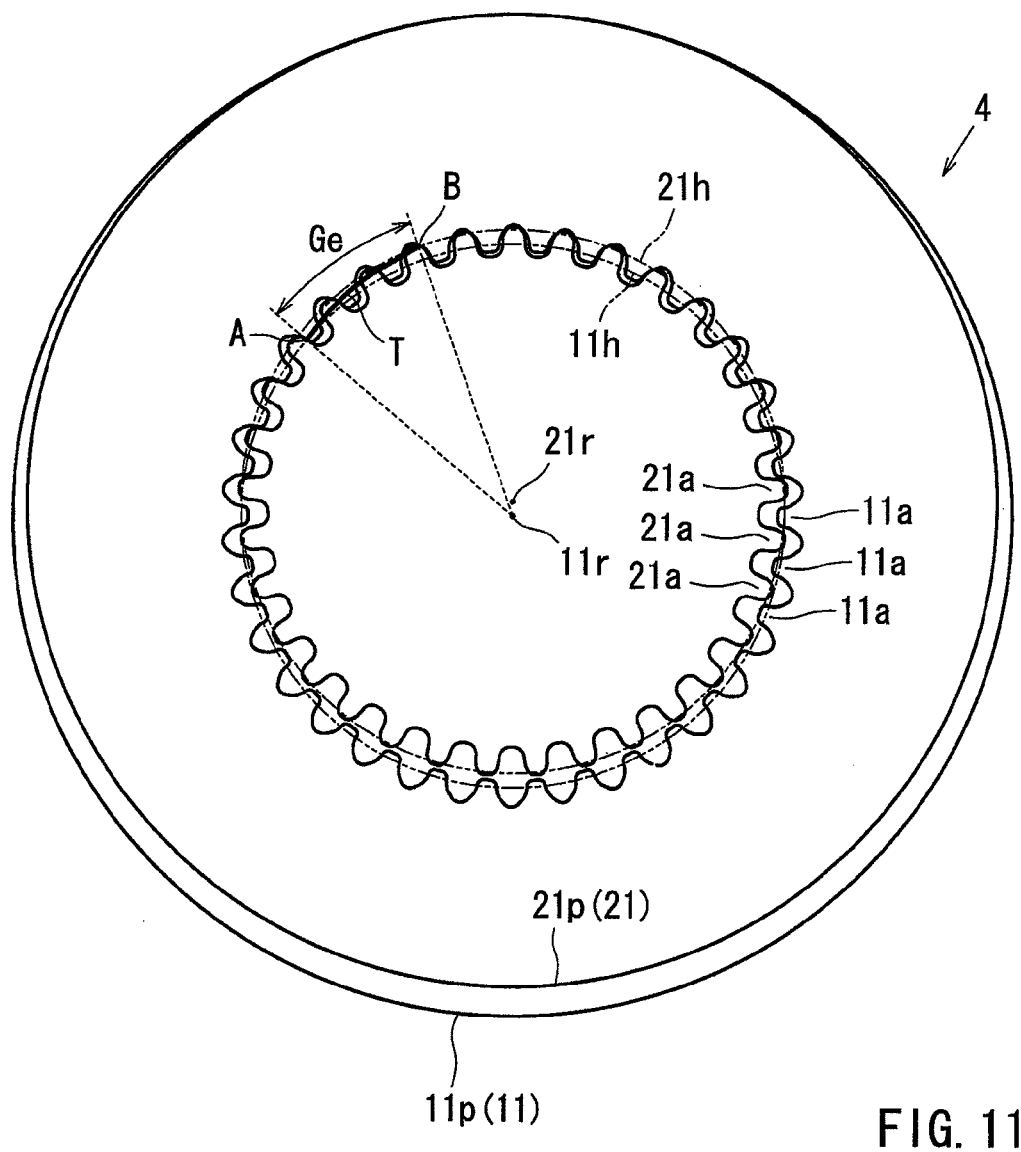
FIG. 11 is an elevational view of the internal and external gear wheels.

As shown in FIGS. 7, 8 and 10, the meshing line T can intersect with a first or internal effective addendum circle 11h of the internal gear wheel 11 at an intersection point A. Also, the meshing line T can intersect with a second or external effective addendum circle 21h of the external gear wheel 21 at an intersection point B. In particular, as shown in FIG. 8, the straight line portions Ta of the meshing line T intersects with the internal effective addendum circle 11h at the intersection point A and extends outwardly toward the external effective addendum circle 21h positioned outside the effective addendum circle 11h in a circumferential direction (clockwise) in which the effective addendum circle 21h is gradually radially outwardly spaced from the effective addendum circle 11h. Conversely, the straight line portions Tc of the meshing line T intersects with the external effective addendum circle 21h at the intersection point B and extends inwardly toward the effective addendum circle 11h in a direction opposite to the straight line portions Ta. The straight line portions Ta and Tc are arcuately smoothly connected via the curved line portion Tb, so that the meshing line T has a substantial arcuate shape. Further, the curved line portion Tb may preferably be formed as a circular arc with radius of 20 mm.

Thus, the meshing line T is positioned between the effective addendum circles 11h and 21h, so as to extend from the intersection point A on the effective addendum circle 11h positioned inside the effective addendum circle 21h in the circumferential direction (clockwise) in which the effective addendum circle 21h is gradually radially outwardly spaced from the effective addendum circle 11h and to reach the intersection point B on the effective addendum circle 21h. In other words, the meshing line T is formed in a meshing area (an area shown by hatching in FIG. 10) defined between the effective addendum circles 11h and the effective addendum circle 21h that is positioned outside the effective addendum circle 11h and is gradually outwardly spaced therefrom clockwise. Further, the meshing line T is shaped to intersect with the effective addendum circle 11h at a narrow end and to intersect with the effective addendum circle 21h at a widened end.

First, in this embodiment, a diameter of a pitch circle 11p of the internal gear wheel 11 is determined as the product of the predetermined number (34) of the teeth 11a of the internal gear wheel 11 and a module (2.6). Similarly, a diameter of a pitch circle 21p of the external gear wheel 21 is determined as the product of the predetermined number (33) of the teeth 21a of the external gear wheel 21 and the module (2.6). The diameters of the pitch circles 11p and 21p thus obtained are respectively 88.4 mm and 85.8 mm. Therefore, as shown in FIG. 7, in a condition in which the pitch circles 11p and 21p contact each other at a pitch point P, a distance between the centers 11r and 21r of the pitch circles 11p and 21p (the internal and external gear wheels 11 and 21) is 1.3 mm.

Further, as previously described, the meshing line T can intersect with the internal effective addendum circle 11h of the internal gear wheel 11 at the intersection point A. Also, the meshing line T can intersect with the external effective addendum circle 21h of the external gear wheel 21 at the intersection point B. Therefore, a circumferential angular range can be defined between the intersection points A and B. In particular, the angular range can be defined between a line L1 connecting the intersection point A and the center 11r of the internal gear wheel 11 and a line L2 connecting the intersection point B and the center 11r of the internal gear wheel 11. The angular range thus defined may be referred to as a meshing range Ge of the meshing line T. Further, the internal and external effective addendum circles 11h and 21h may be referred to as first and second circles determining the meshing range Ge of the meshing line T.

The special tooth profiles of the internal gear wheel 11 and the external gear wheel 21 will be determined using a method as follows.

Figure 9:
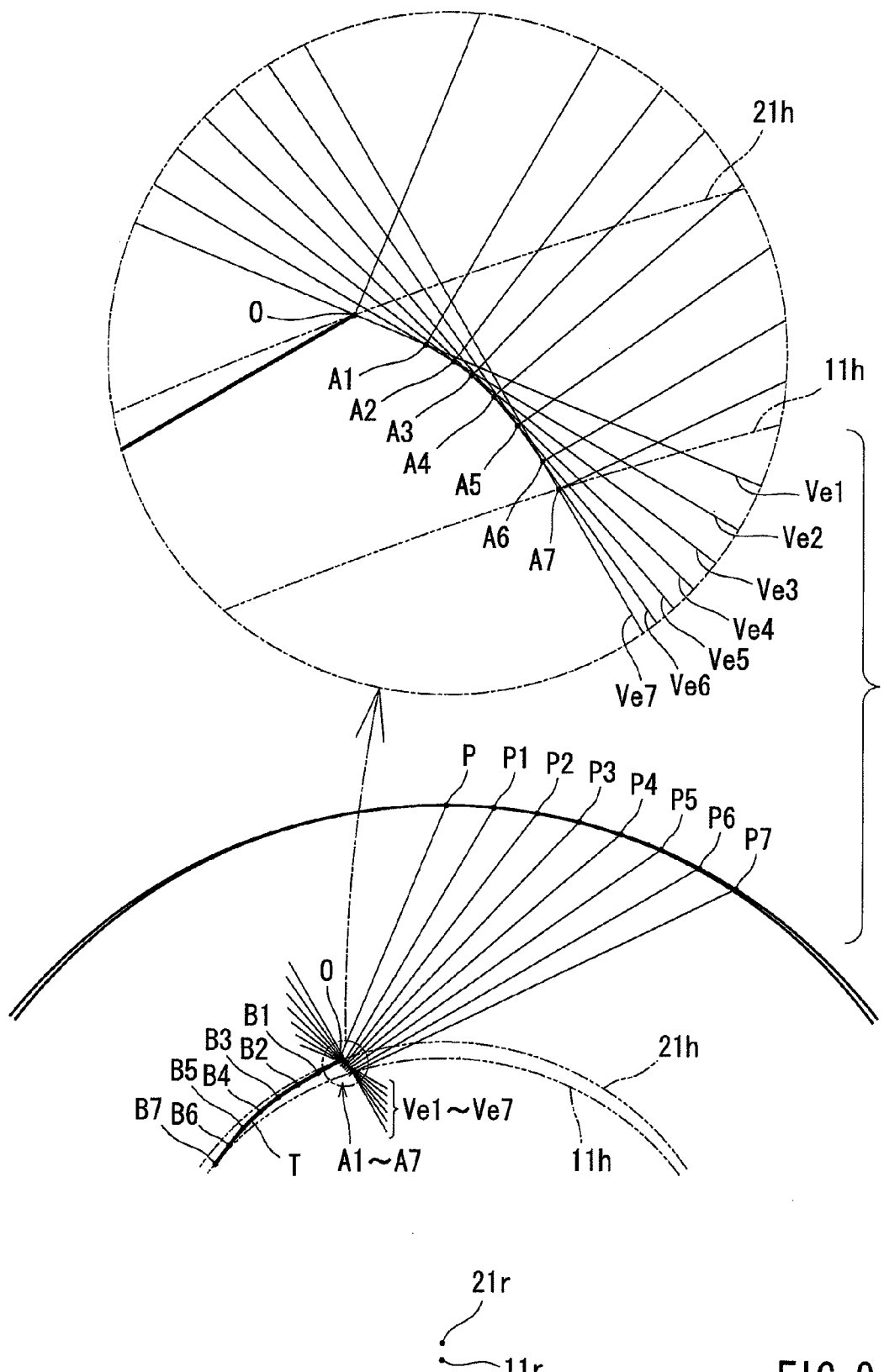
FIG. 9 is an explanatory view which illustrates a method to determine a tooth profile of each of the internal and external gear wheels.

First, in order to determine the tooth profile of the internal gear wheel 11, as shown in FIG. 9, a reference point O is determine on the meshing line T. Further, a plurality of points (seven points B1-B7 in this embodiment) are determined on the meshing line T by reference to the reference point O. The points B1-B7 may preferably be determined at desired intervals in series. Thereafter, a straight line Ve1 passing through the reference point O is drawn so as to be perpendicular to a line segment connecting the pitch point P and the reference point O (a line segment P-O). Next, the point B1 and the pitch point P are respectively rotated or moved clockwise about the center 11r of the internal gear wheel 11 without changing a relative positional relation among the center 11r, the point B1 and the pitch point P until the point B11 intersects with the straight line Ve1. When the point B1 intersects with the straight line Ve1, an intersection point of the point B1 and the straight line Ve1 is determined as a point A1. Conversely, a rotational position of the pitch point P at the time is determined as a shifted pitch point P1.

Subsequently, a straight line Ve2 passing through the point A1 is drawn so as to be perpendicular to a line segment connecting the shifted pitch point P1 and the point A1 (a line segment P1-A1). Next, the point B2 and the pitch point P are respectively rotated or moved clockwise about the center 11r of the internal gear wheel 11 without changing a relative positional relation among the center 11r, the point B2 and the pitch point P until the point B2 intersects with the straight line Ve2. When the point B2 intersects with the straight line Ve2, an intersection point of the point B2 and the straight line Ve2 is determined as a point A2. Conversely, a rotational position of the pitch point P at the time is determined as a shifted point P2.

Further, a straight line Ve3 passing through the point A2 is drawn so as to be perpendicular to a line segment connecting the shifted pitch point P2 and the point A2 (a line segment P2-A2). Next, the point B3 and the pitch point P are respectively rotated or moved clockwise about the center 11r of the internal gear wheel 11 without changing a relative positional relation among the center 11r, the point B3 and the pitch point P until the point B3 intersects with the straight line Ve3. When the point B3 intersects with the straight line Ve3, an intersection point of the point B3 and the straight line Ve3 is determined as a point A3. Conversely, a rotational position of the pitch point P at the time is determined as a shifted point P3.

Similarly, remaining points A4-A7 can be determined. Thus, all of the points A1-A7 can be determined. Thereafter, the points A1-A7 thus obtained are connected as a smooth curve. The curve thus formed can be determined as a shape of each of functional or substantial portions (meshing portions) of the tooth profile of the internal gear wheel 11.

Conversely, a shape of each of functional or substantial portions (meshing portions) of the tooth profile of the external gearwheel 21 can be determined as the same manner as described above, except that each of the points B1-B7 and the pitch point P are respectively rotated about the center 21r of the external gear wheel 21.

Thus, the tooth profiles of the internal gear wheel 11 and the external gear wheel 21 can respectively determined. Further, the method as described above is known and is disclosed in, for example, Setsuo Fukunaga et al., Zusetsu Kikogaku, 2nd Edition, Rikogakusha (1972), Japan.

In addition, as shown in FIG. 10, rounded portions R1 and R2 may preferably be formed in each of nonfunctional portions (non-meshing portions) of the tooth profile of the profiled internal gear wheel 11, so that the internal gear wheel 11 can be easily formed by half die cutting. In particular, the rounded portions R1 are formed in a tooth tip portion of each of the teeth 11a of the internal gear wheel 11, so as to be positioned between the effective addendum circle 11h (i.e., a circle connecting tip-side limit points in actual mesh portions of the teeth 11a) and an addendum circle 11m (i.e., a circle simply connecting tooth tips of the teeth 11a). Further, the actual mesh portions of the teeth 11a mean portions that are actually capable of meshing with the teeth 21a of the external gear wheel 21.

Conversely, the rounded portions R2 are formed in a tooth root portion of each of the teeth 11a of the internal gear wheel 11, so as to be positioned between an effective dedendum circle (not shown) (i.e., a circle connecting root-side limit points in the actual mesh portions on the teeth 11a) and a dedendum circle 11n (i.e., a circle simply connecting tooth roots of the teeth 11a).

Similarly, as shown in FIG. 10, rounded portions k3 and R4 may preferably be formed in each of nonfunctional portions (non-meshing portions) of the profiled external gear wheel 21 for easy formation of the external gear wheel 21 by half die cutting. In particular, the rounded portions R3 are formed in a tooth tip portion of each of the teeth 21a of the external gear wheel 21, so as to be positioned between the effective addendum circle 21h (i.e., a circle connecting tip-side limit points in actual mesh portions of the teeth 21a) and an addendum circle 21m (i.e., a circle simply connecting tooth tips of the teeth 21a). Further, the actual mesh portions of the teeth 21a mean portions that are actually capable of meshing with the teeth 11a of the internal gear wheel 11.

Conversely, the rounded portions R4 are formed in a tooth root portion of each of the teeth 21a of the external gear wheel 21, so as to be positioned between an effective dedendum circle (not shown) (i.e., a circle connecting root-side limit points in the actual mesh portions of the teeth 21a) and a dedendum circle 21n (i.e., a circle simply connecting tooth roots of the teeth 21a).

As described above with reference to FIG. 8, in the reclining device 4 (the connecting device), the tooth profiles of the internal gear wheel 11 and the external gear wheel 21 are respectively determined such that the meshing line T of the internal and external gear wheels 11 and 21 can be defined as the combined line composed of the combination of the straight line portions Ta and Tc and the curved line portion Tb in this embodiment (i.e., a combined line composed of a combination of two or more line portions). Therefore, the meshing line T can be lengthened within the meshing range Ge (i.e., a limited meshing range). In particular, because the meshing line T of the internal and external gear wheels 11 and 21 is defined as the combined line composed of the combination of the straight line portions Ta and Tc and the curved line portion Tb, the meshing line T can be easily shaped to the smooth arcuate shape. As a result, the tooth profiles of the internal gear wheel 11 and the external gear wheel 21 can be smoothened.

Naturally, various changes and modifications may be made to the present invention without departing from the scope of the invention. For example, in the embodiment, a gear assembly of the internal and external gear wheels 11 and 21 is used in the reclining device 4 (the connecting device). However, the gear assembly can be used in various devices using gear assemblies.

Further, the reclining device 4 can be used to connect the seat back 2 to a vehicle floor (not shown) and not the seat cushion 3.

Further, the reclining device 4 can be used to rotatably connect the vehicle seat 1 (the seat cushion 3) to the vehicle floor, so as to rotate the whole vehicle seat 1 relative to the vehicle floor. Also, the reclining device 4 can be used to rotatably connect an ottoman (not shown) to the seat cushion 3 or the vehicle floor.

Further, in this embodiment, the number of the teeth 21a of the external gear wheel 21 is fewer than the number of the teeth 11a of the internal gear wheel 11. However, the number of the teeth 21a of the external gear wheel 21 can be larger than the number of the teeth 11a of the internal gear wheel 11. Naturally, in such a case, a relative rotational of the internal and external gear wheels 11 and 21 can be reversed.

Figure 12:
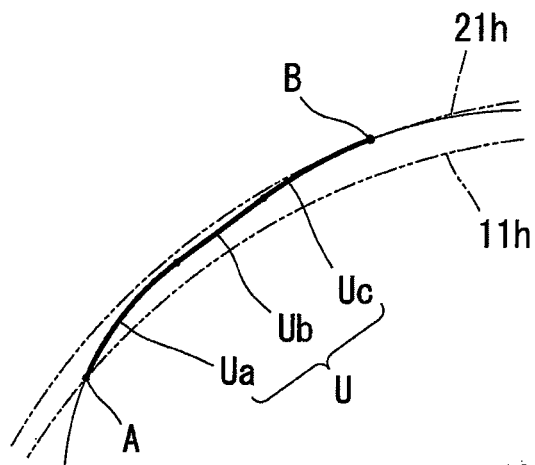
FIG. 12 is an explanatory view of a modified form of the meshing line of the internal and external gear wheels.
Figure 13:
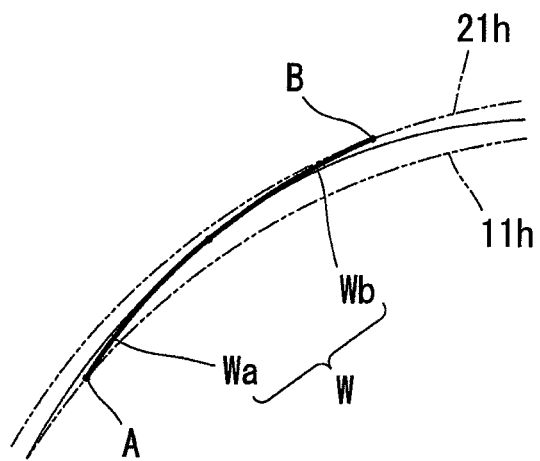
FIG. 13 is an explanatory view of an additional modified form of the meshing line of the internal and external gear wheels.

Further, the combined line composed of the combination of the straight line portions Ta and Tc and the curved line portion Tb is exemplified as the meshing line T of the internal and external gear wheels 11 and 21. However, as shown in FIG. 12, the tooth profiles of the internal gear wheel 11 and the external gear wheel 21 can respectively be determined such that the internal and external gear wheels 11 and 21 have a meshing line U that is defined as a combined line composed of a combination of two curved line portions Ua and Uc and a straight line portion Ub connecting the curved line portions Ua and Uc. Further, as shown in FIG. 13, the tooth profiles of the internal gear wheel 11 and the external gear wheel 21 can respectively be determined such that the internal and external gear wheels 11 and 21 have a meshing line W that is defined as a combined line composed of a combination of two curved line portions Wa and Wb. Thus, the tooth profiles of the internal gear wheel 11 and the external gear wheel 21 can respectively be determined such that the internal and external gear wheels 11 and 21 have a meshing line that is defined as a combined line composed of a combination of various types of line portions.

What is claimed is:

1. A gear assembly comprising:
    first and second gear wheels, a plurality of teeth on the first gear wheel configured to mesh with a plurality of teeth on the second gear wheel, and having a meshing line, the meshing line defining a trajectory of contacting points of meshing teeth of the first and second gear wheels,
    wherein the meshing line is formed as a combined line that is positioned between a first addendum circle, of the first gear wheel, and a second addendum circle, of the second gear wheel, to determine a circumferential angular meshing range of the meshing line, so as to extend from a point on the first addendum circle positioned radially inside the second addendum circle in a circumferential direction in which the second addendum circle is gradually radially outwardly spaced from the first addendum circle and to reach a point on the second addendum circle, and
    wherein the combined line is composed of a combination of a plurality of line portions, one of the plurality of line portions intersecting the first addendum circle and another of the plurality line portions intersecting the second addendum circle.

2. The gear assembly as defined in claim 1, wherein the combined line is composed of a combination of at least one curved line portion and at least one straight line portion or a combination of a plurality of curved line portions.

3. A connecting device that is capable of rotatably connecting a seat back and a seat cushion, comprising:
    an internal gear member connected to one of the seat back and the seat cushion and having an internal gear wheel; and
    an external gear member connected to the other of the seat back and the seat cushion and having an external gear wheel,
    wherein the external gear member is coupled to the internal gear member while the external gear wheel meshes with the internal gear wheel,
    wherein the external gear wheel has an outer diameter smaller than an inner diameter of the internal gear wheel and has a number of teeth different from a number of teeth of the internal gear wheel,
    wherein when the external gear wheel relatively moves along an inner circumferential surface of the internal gear wheel while meshing points of the external and internal gear wheels are sequentially changed, the external gear wheel and the internal gear wheel are gradually rotated relative to each other due to a difference between the number of teeth of the internal gear wheel and the number of teeth of the external gear wheel, so that a tilt angle of the seat back can be changed,
    wherein a meshing line of the internal and external gear wheels is formed as a combined line that is positioned between a first addendum circle, of the internal gear wheel, and a second addendum circle, of the external gear wheel, to determine a circumferential angular meshing range of the meshing line, so as to extend from a point on the first addendum circle positioned radially inside the second addendum circle in a circumferential direction in which the second addendum circle is gradually radially outwardly spaced from the first addendum circle and to reach a point on the second addendum circle, the meshing line defining a trajectory of contacting points of meshing teeth of the internal and external gear wheels, and
    wherein the combined line is composed of a combination of a plurality of line portions, one of the plurality of line portions intersecting the first addendum circle and another of the plurality line portions intersecting the second addendum circle.

4. The gear assembly as defined in claim 3, wherein the combined line is composed of a combination of at least one curved line portion and at least one straight line portion or a combination of a plurality of curved line portions.

5. The gear assembly as defined in claim 3, wherein the internal and external gear wheels are respectively cylindrically formed by half die cutting,
    wherein the internal gear member has a cylindrical portion that is positioned in a central portion of the internal gear wheel and is axially projected,
    wherein the external gear member has a circular opening that is positioned in a central portion of the external gear wheel and is capable of receiving the cylindrical portion of the internal gear member therein,
    wherein when the external gear member is coupled to the internal gear member, axes of the cylindrical portion and the circular opening are offset from each other, so that an eccentric annular space can be formed therebetween,
    wherein a pair of eccentric members are fitted into the eccentric annular space, the eccentric members being arranged and constructed to be normally circumferentially pressed such that the external gear wheel can be pressed to the inner circumferential surface of the internal gear wheel, and wherein when one of the eccentric members is circumferentially rotated, the other of the eccentric members is rotated in the same direction, so that the meshing points of the external and internal gear wheels can be changed.

* * * * *